(12) United States Patent
Tracht et al.

(10) Patent No.: US 8,104,789 B2
(45) Date of Patent: Jan. 31, 2012

(54) SEAT

(75) Inventors: Michael Tracht, Ingolstadt (DE); Rainer Penzel, Freising (DE); Thomas Klisch, Munich (DE); Sebastian Geithner, Munich (DE); Wolfgang Hermann, Munich (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/984,841

(22) Filed: Jan. 5, 2011

(65) Prior Publication Data

US 2011/0095513 A1 Apr. 28, 2011

Related U.S. Application Data

(62) Division of application No. 11/996,471, filed as application No. PCT/EP2005/008036 on Jul. 22, 2005, now Pat. No. 7,891,701.

(51) Int. Cl.
*B60R 21/207* (2006.01)
(52) U.S. Cl. .................................... 280/730.2
(58) Field of Classification Search .............. 280/730.2
See application file for complete search history.

(56) References Cited

U.S. PATENT DOCUMENTS

| | | | |
|---|---|---|---|
| 5,826,938 A | 10/1998 | Yanase et al. | |
| 7,195,277 B2 * | 3/2007 | Tracht et al. | 280/730.2 |
| 7,290,793 B2 * | 11/2007 | Tracht | 280/730.2 |
| 7,393,005 B2 | 7/2008 | Inazu et al. | |
| 7,540,529 B2 * | 6/2009 | Tracht et al. | 280/730.2 |
| 2004/0227335 A1 | 11/2004 | Acker et al. | |
| 2005/0006933 A1 | 1/2005 | Bargheer et al. | |
| 2006/0113759 A1 * | 6/2006 | Tracht et al. | 280/730.2 |
| 2006/0113760 A1 * | 6/2006 | Tracht et al. | 280/730.2 |

FOREIGN PATENT DOCUMENTS

| | | |
|---|---|---|
| DE | 198 60 312 | 7/1999 |
| DE | 199 15 831 | 10/2000 |
| DE | 10 2005 017 395 | 11/2006 |
| EP | 1375264 | 1/2004 |
| FR | 2861352 | 4/2005 |

OTHER PUBLICATIONS

German Office Action for the corresponding German patent application 11 2005 003 642.1-56 mailed Dec. 1, 2008.
International Search Report for the corresponding PCT Appn. No. PCT/EP2005/008036 mailed Mar. 31, 2006.

* cited by examiner

*Primary Examiner* — Faye M. Fleming
(74) *Attorney, Agent, or Firm* — MacMillan, Sobanski & Todd, LLC

(57) ABSTRACT

A seat assembly having a seat structure, a cover, a back panel, and a package plate. The back panel has a lateral wall that covers a receiving space in which a side airbag module is arranged. The package plate is arranged between the lateral wall and the side airbag module. The package plate has a back end that engages the seat structure and a front end disposed opposite the back end that is located within the receiving space. An airbag of the side airbag module is configured to deploy between the front end and the cover and between the cover and a free end of the lateral wall.

20 Claims, 7 Drawing Sheets

SEAT

CROSS-REFERENCE TO RELATED APPLICATIONS

This application is a division of U.S. application Ser. No. 11/996,471, filed Apr. 22, 2008, now issued as U.S. Pat. No. 7,891,701, which was the National Stage of International Application No. PCT/EP05/08036, filed Jul. 22, 2005.

BACKGROUND

1. Field

Embodiments of the present invention relate to a seat assembly having a side airbag module.

SUMMARY

In at least one embodiment a seat assembly is provided. The seat assembly may include a backrest having a seat structure, a cover, a back panel, and a package plate. The back panel has a lateral wall that covers a receiving space in which a side airbag module is arranged. The package plate is arranged between the lateral wall and the side airbag module. The package plate has a back end that fastened to the seat structure and a front end disposed opposite the back end that is located within the receiving space. The front end includes a bracket-like element that engages a clip that extends from an inner surface of the lateral wall toward the side airbag module. An airbag of the side airbag module is configured to deploy between the front end and the cover and between the cover and a free end of the lateral wall.

In at least one embodiment a seat assembly is provided. The seat assembly includes a seat structure, a cushion disposed proximate the seat structure, a cover disposed over the cushion, a soft cover side airbag module, a back panel, and a package plate. The soft cover side airbag module is disposed in a receiving space that is disposed adjacent to the seat structure and the cushion. The soft cover side airbag module has an airbag. The back panel has a lateral wall and a clip. The lateral wall covers the receiving space and has a free end and an inner surface that faces toward the side airbag module. The clip is disposed on the inner surface. The package plate is disposed in the receiving space between the lateral wall and the side airbag module. The package plate is spaced apart from the lateral wall and has a back end that engages the seat structure and a front end disposed opposite the back end and that includes a bracket-like element that receives the clip. The airbag is configured to deploy between the front end and the cover and then between the cover and the free end of the lateral wall.

DETAILED DESCRIPTION

Figure 1:
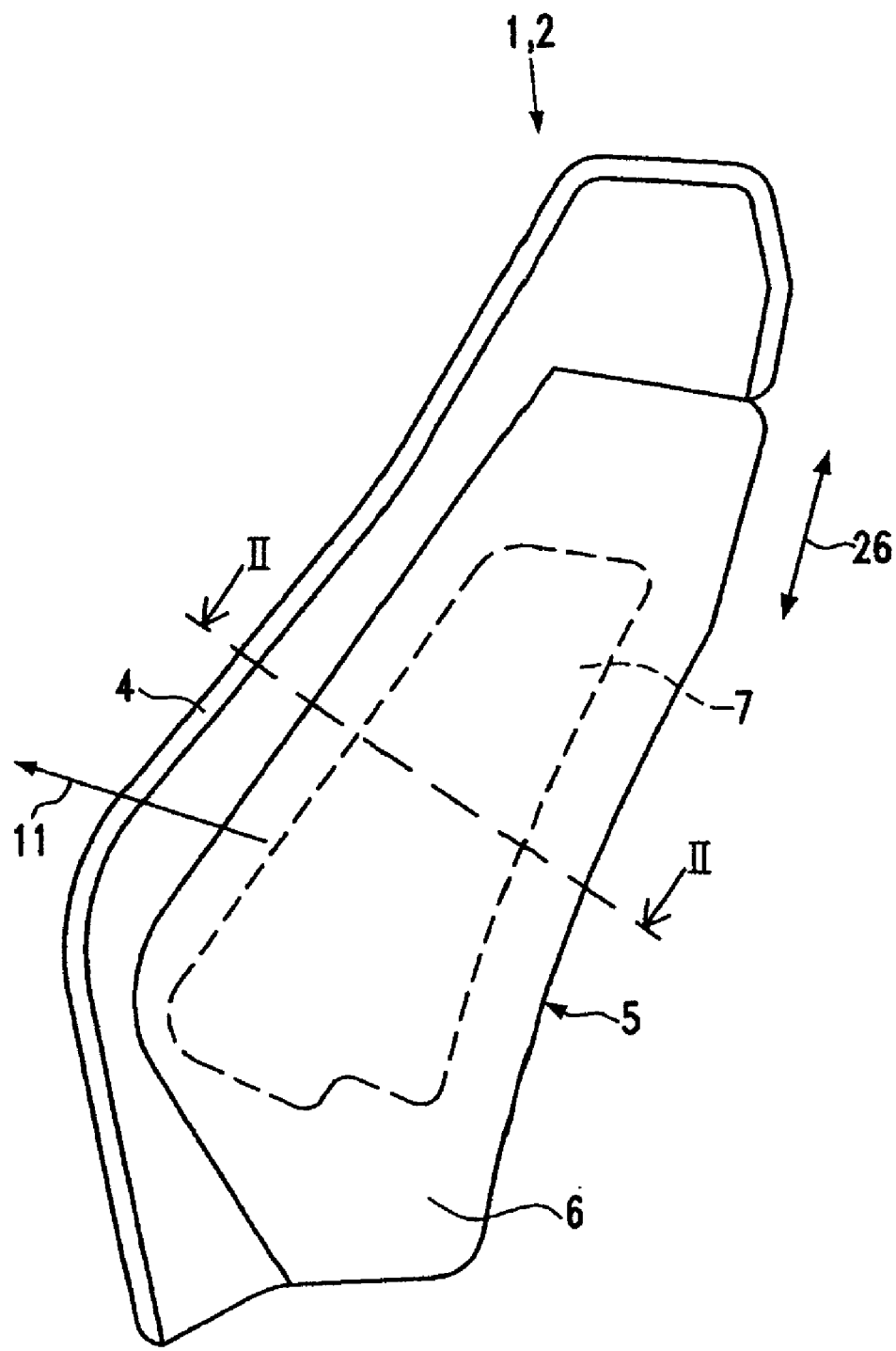
FIG. 1 shows a lateral view of a seat and, in particular, of a backrest of this seat.

In the following the same parts of the seat are notified by the same reference numerals and some of those reference numerals are only mentioned in combination with one figure.

In FIG. 1 a lateral view of a backrest 2 of a seat 1 of a vehicle is illustrated. In this lateral view a side wall 8 of the backrest 2 is visible which is at least partially covered by a lateral wall 6 of back panel 5. Beneath the lateral wall 6 a receiving space 7 is formed in the side wall 8 of the backrest 2. Within this receiving space 7 a soft cover side airbag module (SAM) 9 is arranged. Upon activation of the SAM 9 a corresponding airbag will be inflated and will be deployed in deployment direction 11. Such SAM 9 are arranged in vehicle seats 1 at least on the side of the seats nearest to the corresponding vehicle door.

The backrest 2 mainly extends in the longitudinal direction 26 along which direction also the back panel 5 or the lateral wall 6 extend.

Figure 2:
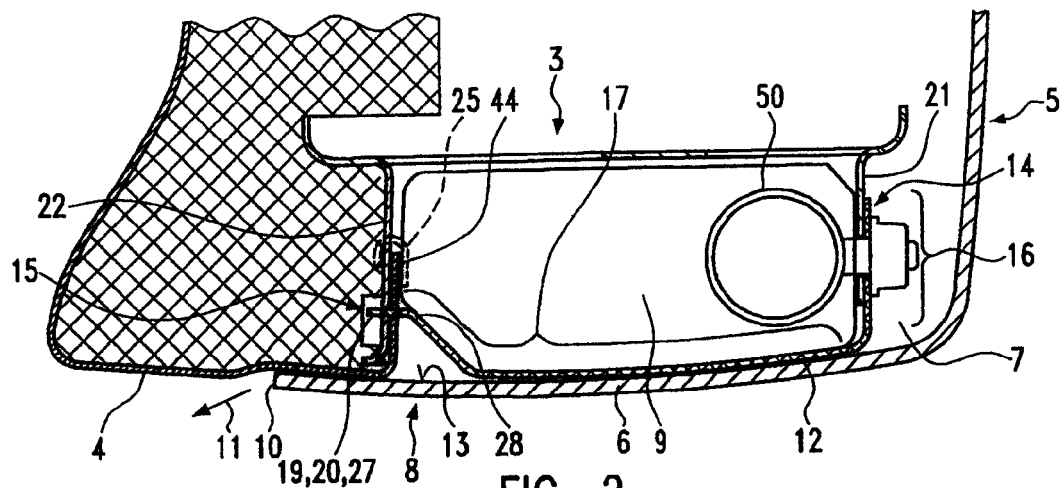
FIG. 2 shows a cross-section along line II-II for a first embodiment of the invention.

In FIG. 2 a first embodiment of the invention corresponding to a cross-section along line II-II of FIG. 1 is illustrated.

Between SAM 9 and an inner surface 13 of lateral wall 6, a package plate 12 is arranged comprising a first plate portion 16 and a second plate portion 17. The first plate portion 16 is used for mounting the package plate 12 together with SAM 9 to a seat structure 3. For this reason the seat structure 3 comprises two stamped-out parts forming a first bracket 21 and a second bracket 22. The first bracket 21 mainly extends in a direction to lateral wall 6 and inflator means 50 as part of SAM 9 is fixed to this bracket 21 by a bolt 48/nut 49 connection. The same connection is also used for fixing first plate portion 16 of package plate 12. The second bracket 22 is used for fastening the package plate 12 at its free end 19 which hook-like element 27 is formed as a plate fastening means 20. The plate fastening means 20 is part of front end section 15 of the package plate 12 which is formed at the end of the second plate portion 17, see also the following figures.

SAM 9 and package plate 6 are arranged in the receiving space 7 which is closed by lateral wall 6 to the outside wherein a free end 10 of the lateral wall together with an end portion are in contact with an outer surface of a part of cover 4. This part of cover 4 is arranged at the side wall 8 of the backrest 2 wherein this part is partially introduced in the receiving space 7 and fastened there by corresponding cover fastening means 25, see the corresponding clip-like element. The cover fastening means 25 are arranged in different levels along longitudinal direction 26 of the backrest 2 compared to corresponding plate fastening means 20. The corresponding fastening means 20, 25 for plate and cover may be alternately arranged along this longitudinal direction 26.

Figure 3:
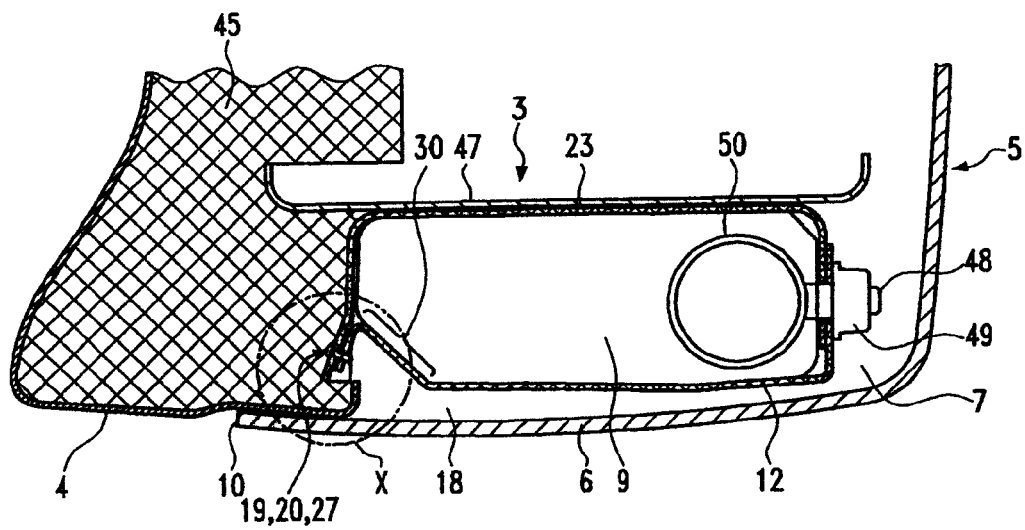
FIG. 3 shows a cross-section like FIG. 2 for a second embodiment.

In the embodiment according to FIG. 2 the lateral wall 6 is in abutment with the package plate 12 and only a first wall portion 30, see also FIG. 3, of front end section 15 is bent inwardly such that the hook-like element 27 is spaced and essentially extends parallel with respect to inner surface 13 of lateral wall 6.

For insertion of hook-like element 27, a hook-in opening 28 is formed in bracket 22.

It is again noted that cover 4 with its cover free end 44 has generally no opening through which a hook-like element 27 is guided, but that the cover 4 only extends up to its free end 44 within the receiving space 7 where no hook-like elements 27 of the package plate 12 are arranged.

The second embodiment according to FIG. 3 has different plate fastening means 20 at free end 19 of front end section 15. Moreover, the package plate 12 is arranged in a distance to inner surface 13 of lateral wall 6 such that a free space 18 is formed therebetween. This free space 18 is increasing in direction to free end 10 of lateral wall 6 wherein the distance 42, see also FIG. 9, between outer surface 43 of package plate 12 and inner surface 13 of lateral wall 6 increases.

Moreover, according to FIG. 3, a mounting plate 23 is arranged between SAM 9 and plate-like element 47 of seat structure 3. No brackets are stamped out of this plate-like element 47, see in contrast the embodiments according to FIGS. 2 and 8.

The inflator means 50 is fixed to the mounting plate 23 by the corresponding bolt 48/nut 49 connection, wherein simultaneously back end section 14 of package plate 12 is fixed to the mounting plate.

Figure 4:
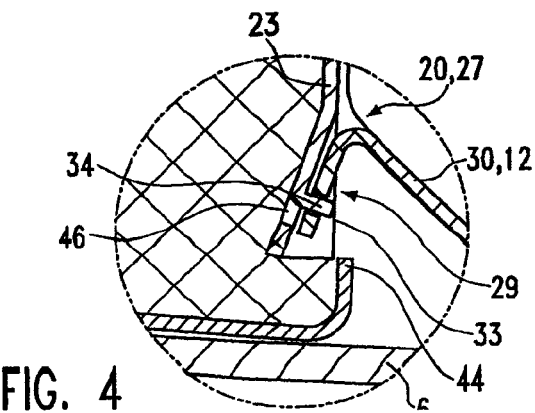
FIG. 4 shows an enlarged detail "X" of FIG. 3.

In FIG. 4 detail "X" of FIG. 3 is illustrated in an enlarged scale. The plate fastening means 20 at the front end section 15 again comprises a hook-like element 27 which is bent in direction to lateral wall 6 with respect to first wall portion 30 of package plate 12. For connecting hook-like element formed as hook extension 29 of the front end section 15 a protrusion 34 is formed by mounting bracket 23. This protrusion 34 is a stamped-out part of the mounting plate, see stamp-out opening 46, and inserted in an opening 33 of the hook-like element 27.

In FIG. 4 the cover free end 44 ends inside the receiving space 7 but is so short that it ends in front of the corresponding hook extension 29. As already outlined above, in other levels along longitudinal direction 26 of backrest 2 the cover may extend farther to the inside of the receiving space and at the corresponding free end 44, cover fastening means 25, see FIG. 2, may be arranged.

Figure 5:
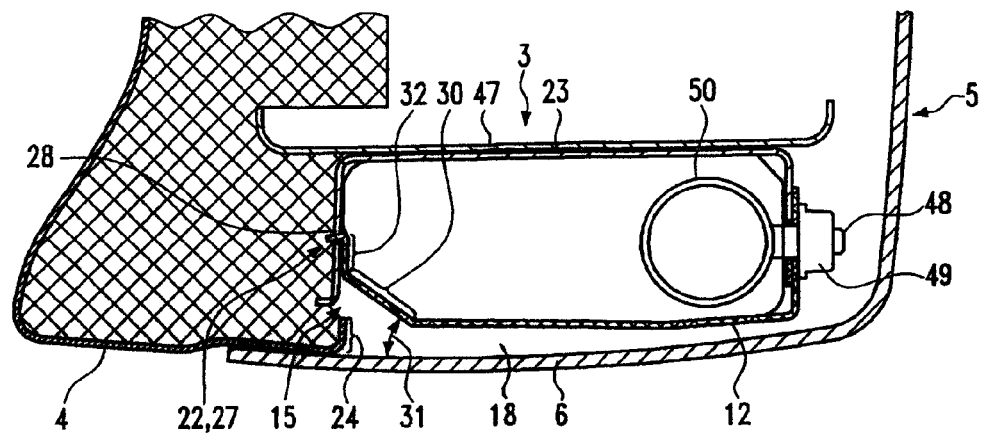
FIG. 5 shows a cross-section like FIG. 2 for a third embodiment.

In FIG. 5 a third embodiment of the invention is illustrated again using mounting plate 23 and package plate 12.

In this embodiment the front end section 15 of the package plate 12 comprises a first wall portion 30 and a second wall portion 32. Between the first wall portion 30 and inner surface of the lateral wall 6 an acuate angle 31 is formed, whereas the second wall portion 32 is arranged essentially perpendicular to lateral wall 6. At the end of this second wall portion 32 a hook-like element 27 as a plate fastening means 20 is formed, which is inserted in a hook-in opening 28 formed in mounting plate 23.

In FIG. 5 corresponding free end portion 24 of the cover 4 arranged within receiving space 7, see also FIG. 3, is so short that it ends in front of the hook-like element 27. However, as already said, in other levels along longitudinal direction 26 this free end portion 24 may be longer to allow the arrangement of corresponding cover fastening means 25.

Figure 6:
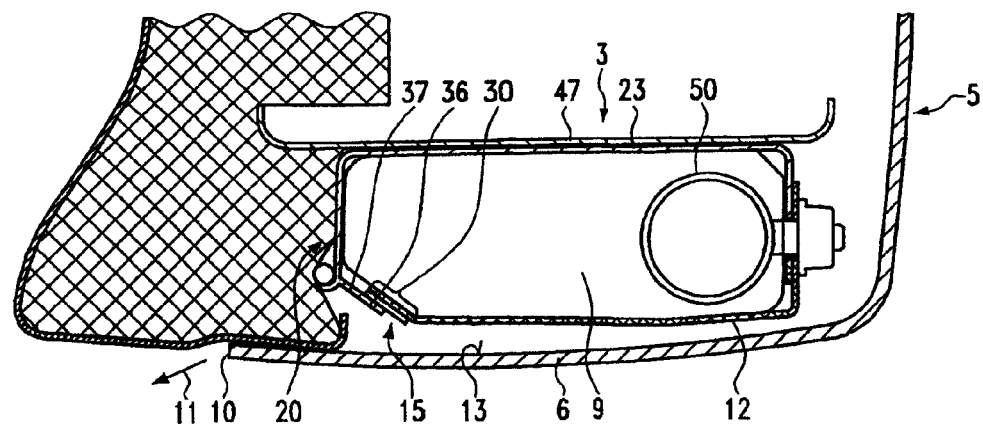
FIG. 6 shows a cross-section like FIG. 2 for a fourth embodiment.
Figure 7:
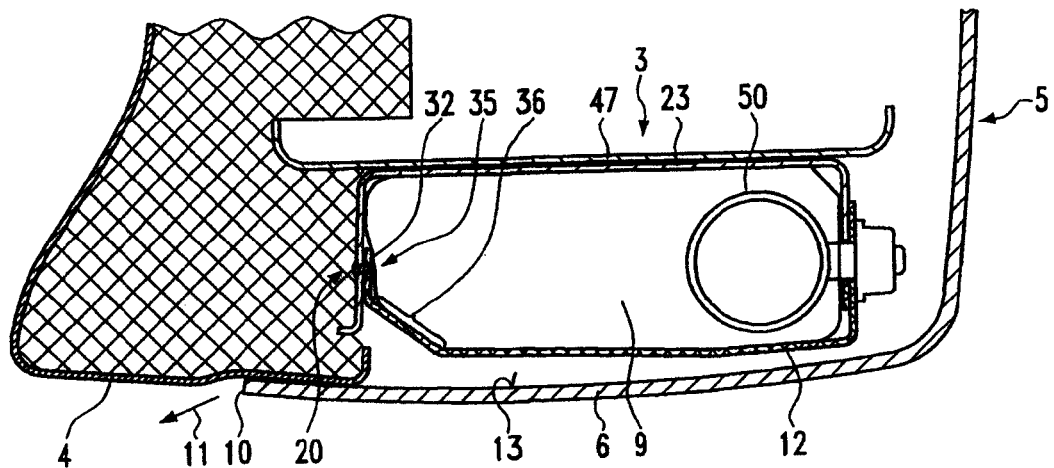
FIG. 7 shows a cross-section like FIG. 2 for a fifth embodiment.

In FIGS. 6 and 7 a fourth and fifth embodiment of the invention is illustrated. These embodiments are different from the embodiments already illustrated by the corresponding plate fastening means 20.

In FIG. 6 the plate fastening means 20 is formed by a toggle 37 which has a breaking point 36. In case the airbag is inflated by inflator means 50, this breaking point 36 will break, the package plate 12 will be bent outwardly until it contacts the inner surface 13 of lateral wall 6 and thereafter both lateral wall 6 and package plate 12 will be further opened to allow the deployment of the airbag along deployment direction 11. The toggle 37 is held by an end curvature of the mounting plate 23. The corresponding breaking point 36 is arranged between toggle 37 and the first wall portion 30 at front end section 15 of package plate 12.

In the fifth embodiment according to FIG. 7, the plate fastening means 20 is formed by a rivet 35 connecting second wall portion 32 of front end section 15 and mounting plate 23. Instead of a rivet 35 also a pin may be used, which is then introduced in a corresponding opening of the mounting plate 23.

All the other features of the embodiments of FIGS. 6 and 7 are very similar to the other embodiments according to FIGS. 2 to 5, such that repetition of these features is avoided.

Figure 8:
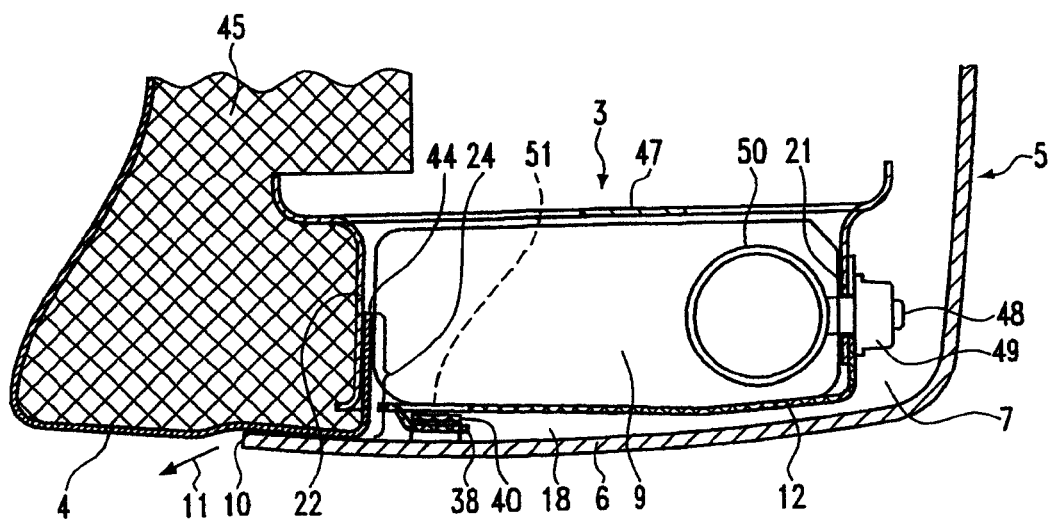
FIG. 8 shows a cross-section like FIG. 2 for a sixth embodiment.
Figure 9:
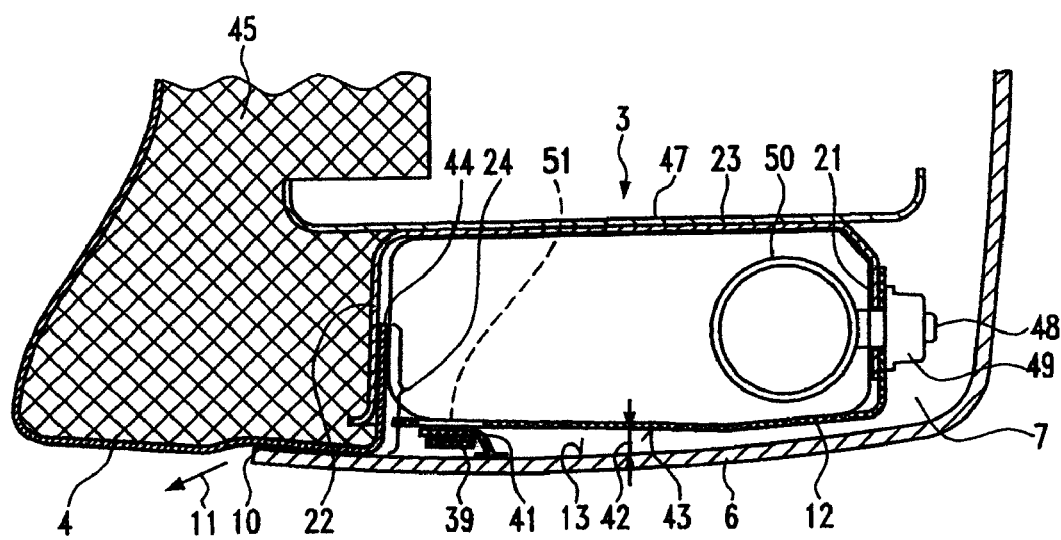
FIG. 9 shows a cross-section like FIG. 2 for a seventh embodiment.

The sixth and seventh embodiments according to FIGS. 8 and 9 are different from the other embodiments in that the package plate 12 is not fastened to the seat structure 3 or the mounting plate 23 at its front end section 15 but it is fastened to lateral wall 6.

In the sixth embodiment according to FIG. 8, SAM 9 is mounted to the corresponding brackets 21 or 22 of seat structure 3, see also FIG. 2. Cover 4 extends into the interior of the receiving space 7 with longer free end portion 24 wherein corresponding cover fastening means is not illustrated, see again FIG. 2.

Near a free end of package plate 12 in its front end section 15 a hook-like element 38 is formed which is in engagement with a bracket-like element 40 extending from the inner surface 13 of lateral wall 6. The hook-like element 38 is formed as a stamped-out part, see the stamp-out opening 51 in package plate 12.

In the seventh embodiment according to FIG. 9, a corresponding bracket-like element 39 is formed at the package plate 12 and extends from its outer surface 43 in direction to inner surface 13 of lateral wall 6, wherein a corresponding hook-like element 41 is protruding from the inner surface 13 in direction to the outer surface 43 of package plate 12.

In particular in the embodiments according to FIGS. 8 and 9 there will be no interference between the plate fastening means 20 and the cover fastening means 25 as they are arranged at different positions within receiving space 7.

Also in the embodiments according to FIGS. 8 and 9 it is possible to first push package plate 12 to the outside and later the package plate 12 together with lateral wall 6 will be further opened for deployment of the airbag, wherein in all of the embodiments a seat cushion material 45, like foam or the like, will be prevented from being expelled to the outside of the backrest as the receiving space 7 and in particular SAM 9 are more or less encompassed by package plate 12, mounting plate 23 and seat structure 3 with corresponding brackets 21 and 22. Consequently, any inflating airbag will be guided by those parts and, in particular, between cover 4 and front end section 15 or lateral wall 6 near its free end 10 to deploy in deployment direction 11.

Figure 10:
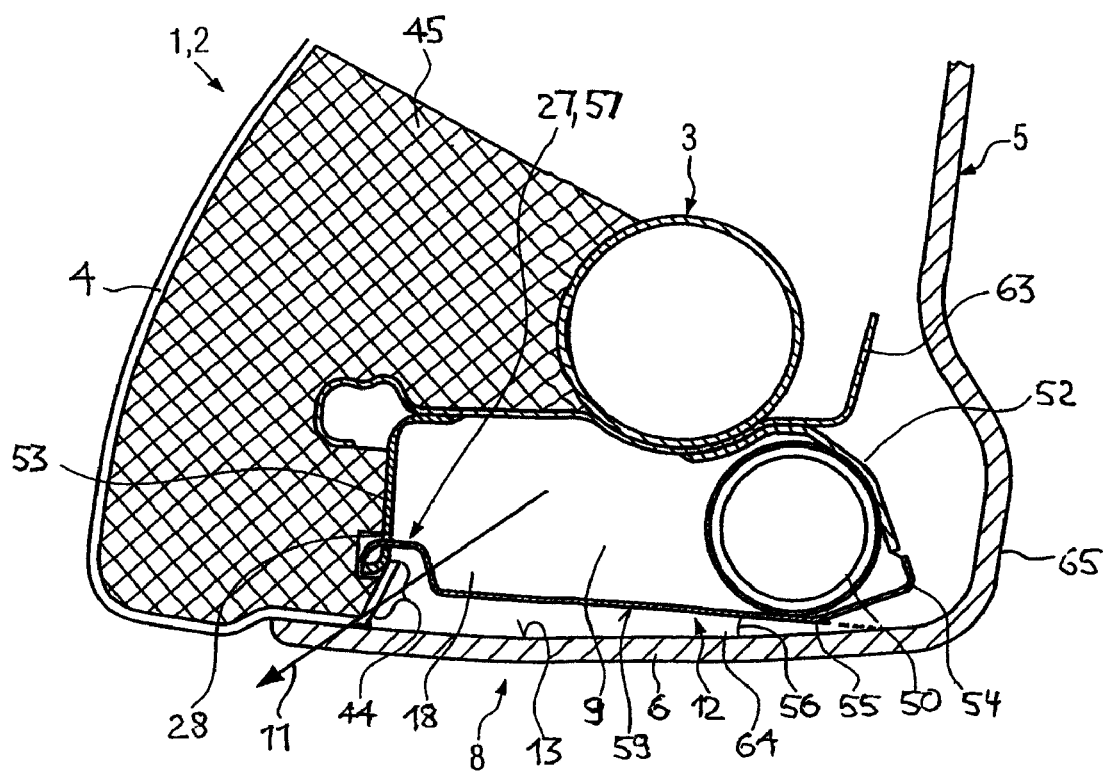
FIG. 10 shows a cross-section like FIG. 2 for an eighth embodiment.
Figure 11:
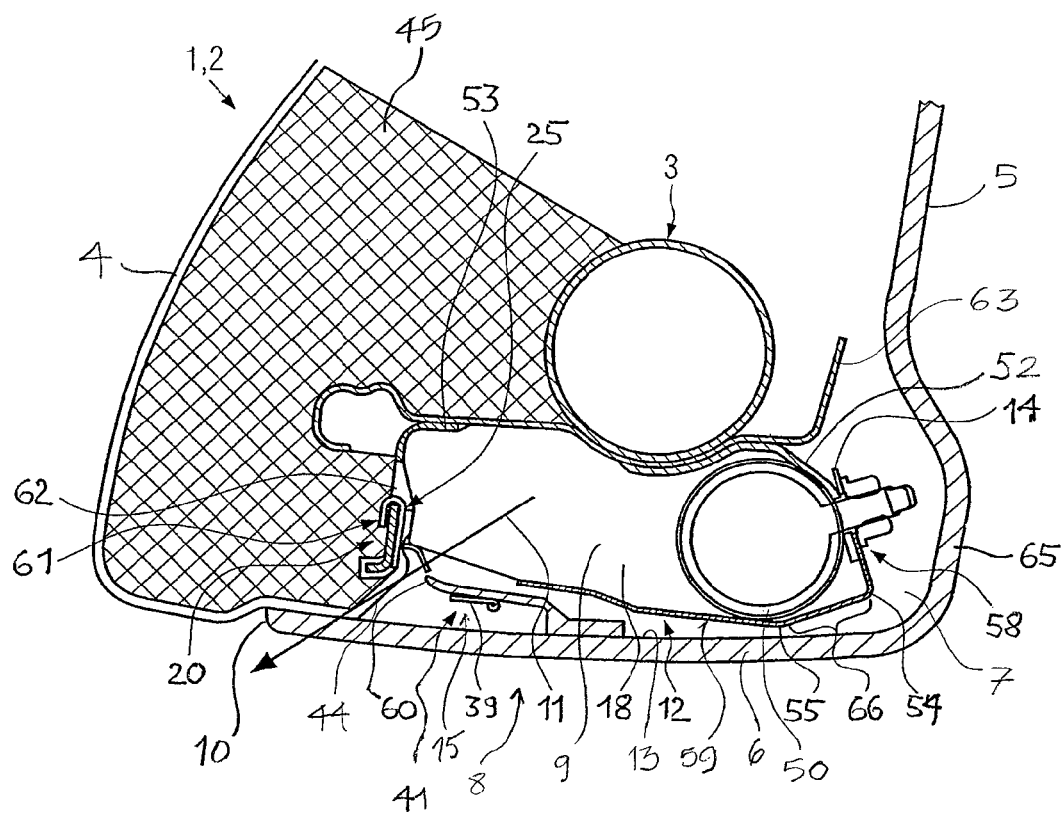
FIG. 11 shows a cross-section like FIG. 2 for a ninth embodiment.

FIGS. 10 and 11 show an eighth and a ninth embodiment of the invention with a slightly different seat structure 3. In both of these embodiments, a first and a second holding part 52, 53 is used, which in particular are releasably fixed to the corresponding seat structure 3.

The corresponding package plate 12 is releasably fixed with its back end section 14 or front end section 15 to the corresponding holding part 52, 53.

In FIG. 10, the package plate, see also FIG. 11, extends from the corresponding first holding part 52, see back end section 14, to a bending point 54 and thereafter with a section 66 essentially perpendicular to the corresponding bend end section 14. Along this section 66, the package plate approaches the inner surface 13 of the lateral wall 6 up to further bending point 55. From this bending point 55, the package plate extends under an angle 56 away from the inner surface 13, wherein the angle is approximately 5° to 30°. This means that the distance between outer surface 59 of the package plate and inner surface 13 of the lateral wall 6 increases in direction to front end section 15 of the package plate 12 where same is releasably fixed to second holding part 53.

A corresponding hook-like element 27 of the package plate 12 for fixing to the second holding part 53 is inserted in a corresponding hook-in opening 28 of this part.

The seat structure 3 also comprises a holding part section 63 extending away from first holding part 52 and generally extending essentially parallel to back panel 5.

Back panel 5 comprises a bulging 65 in connection to the sidewall 8 and arranged in the rear of inflator means 50. This bulging 65 protrudes to the rear from backrest 2.

According to this particular package plate 12 in FIG. 10 and also in FIG. 11, a corresponding space between outer surface 59 of the package plate and inner surface 13 of the lateral wall increases in direction to the front of the backrest, see also FIG. 3 or FIGS. 5 to 9.

In FIG. 11, package plate 12 is quite similar to FIG. 10 besides a step in the package plate in the area of hook-like element 41 of the lateral wall 6, which is in engagement with a bracket-like element 39 of the package plate 12.

The corresponding hook-like element 38 is formed like a clip 60, see the similar construction in FIG. 9.

The second holding part 53 is also used for fixing the cover 4. The cover 4 and 44 comprises cover fastening means 25 in the form of a profiled latch with, for example, three hook-up noses 61 in engagement with corresponding hook-in openings 62 formed in the second holding part 53.

In FIG. 11, it is again emphasized that the corresponding section 66 of the package plate 12 between the two bending points 54 and 55 extends essentially perpendicular to the back end section 14. This back end section 14 is formed as a fixing tongue 58, which is used for fixing to the first holding part 52, wherein together with the fixing tongue, also the inflator means 50 is fixed to this holding part.

While embodiments of the invention have been illustrated and described, it is not intended that these embodiments illustrate and describe all possible forms of the invention. Rather, the words used in the specification are words of description rather than limitation, and various changes may be made without departing from the spirit and scope of the invention.

What is claimed is:

1. A seat assembly comprising:
a backrest having a seat structure, a cover, a back panel having a lateral wall that covers a receiving space in which a side airbag module is arranged; and
a package plate arranged between the lateral wall and the side airbag module, the package plate having a back end fastened to the seat structure and a front end disposed opposite the back end that is located within the receiving space, the front end including a bracket-like element that engages a clip that extends from an inner surface of the lateral wall toward the side airbag module;
wherein an airbag of the side airbag module is configured to deploy between the front end and the cover and between the cover and a free end of the lateral wall.

2. The seat assembly of claim 1 wherein the side airbag module is a soft cover side airbag module.

3. The seat assembly of claim 1 wherein the package plate is spaced apart from the lateral wall when the airbag is not deployed.

4. The seat assembly of claim 1 wherein the front end of the package plate engages the cover and is spaced apart from the seat structure when the airbag is not deployed.

5. The seat assembly of claim 1 wherein the clip extends toward the front end of the package plate.

6. The seat assembly of claim 1 wherein the clip and the lateral wall are spaced apart from the side airbag module when the airbag is not deployed.

7. The seat assembly of claim 1 wherein the bracket-like element is spaced apart from the lateral wall.

8. The seat assembly of claim 1 wherein the back end of the package plate engages an inflator of the side airbag module.

9. A seat assembly comprising:
a seat structure;
a cushion disposed proximate the seat structure;
a cover disposed over the cushion;
a soft cover side airbag module disposed in a receiving space that is disposed adjacent to the seat structure and the cushion, the soft cover side airbag module having an airbag;
a back panel having a lateral wall and a clip, wherein the lateral wall covers the receiving space and has a free end and an inner surface that faces toward the side airbag module, and wherein the clip is disposed on the inner surface; and
a package plate disposed in the receiving space between the lateral wall and the side airbag module, the package plate being spaced apart from the lateral wall and having a back end 14 that engages the seat structure and a front end disposed opposite the back end and that includes a bracket-like element that receives the clip;
wherein the airbag is configured to deploy between the front end and the cover and then between the cover and the free end of the lateral wall.

10. The seat assembly of claim 9 wherein the seat structure includes a first holding part releasably fixed to the seat structure, wherein the back end is fastened to the first holding part.

11. The seat assembly of claim 10 wherein the seat structure includes a second holding part releasably fixed to the seat structure and spaced apart from the first holding part, wherein the front end does not engage the second holding part.

12. The seat assembly of claim 11 further comprising a cover fastener disposed at an end of the cover, wherein the cover fastener is disposed in an opening in the second holding part such that cover separates the front end from the cover fastener.

13. The seat assembly of claim 9 wherein the package plate engages the side airbag module.

14. The seat assembly of claim 9 wherein the package plate includes an outer surface that faces toward the inner surface of the lateral wall, wherein the outer surface is spaced apart from the lateral wall and the clip when the airbag is not deployed.

15. The seat assembly of claim 14 wherein the package plate includes a fixing tongue fastened to the seat structure, a first section that extends from an end of the fixing tongue toward the lateral wall, and a second section that extends from an end of the first section at an angle with respect to the inner surface of the lateral wall such that the distance between the outer surface of the package plate and the inner surface of the lateral wall increases in a direction extending toward the front end of the package plate.

16. The seat assembly of claim 9 wherein the package plate includes a fixing tongue fastened to the seat structure, a first section that extends substantially perpendicular from an end of the fixing tongue, the first section having a first bending point disposed at a first end and a second bending point disposed at a second end disposed opposite the first end, wherein the second bending point is disposed closer to the lateral wall than any other point of the package plate.

17. The seat assembly of claim 16 wherein the clip is disposed further away from the inner surface of the lateral wall than the second bending point.

18. A seat assembly comprising:

a backrest having a seat structure, a cover, a back panel having a lateral wall that covers a receiving space in which a side airbag module is arranged, the lateral wall having a clip that extends from an inner surface of the lateral wall toward the side airbag module; and a package plate arranged between the lateral wall and the side airbag module, the package plate being fastened along a back end to the side airbag module to the seat structure and a front end including a bracket that engages the clip;

wherein an airbag of the side airbag module is configured to deploy between the front end and the cover and then between the cover and a free end of the lateral wall.

19. The seat assembly of claim 18 wherein the back end of package plate comprises a first section is fastened to the seat structure and the package plate having a second section that extends from the first section from a first bending point, the package plate having a second bending point disposed at a second end of the second section, wherein the second bending point is disposed closer to the lateral wall than any other point of the package plate.

20. The seat assembly of claim 19 wherein the clip is extending further away from the lateral wall than the second bending point.

* * * * *